(12) United States Patent
Bassett (10) Patent No.: US 6,422,012 B1
(45) Date of Patent: Jul. 23, 2002

(54) ACTUATOR AND POSITIONING DEVICE

(75) Inventor: Roger Bassett, Cornwall (GB)

(73) Assignee: Rigibore Limited (GB)

( * ) Notice: Subject to any disclaimer, the term of this patent is extended or adjusted under 35 U.S.C. 154(b) by 0 days.

(21) Appl. No.: 09/744,119

(22) PCT Filed: Jul. 12, 1999

(86) PCT No.: PCT/GB99/02236

§ 371 (c)(1),
(2), (4) Date: Mar. 8, 2001

(87) PCT Pub. No.: WO00/05724

PCT Pub. Date: Feb. 3, 2000

(30) Foreign Application Priority Data

Jul. 21, 1998 (GB) .............................. 9815724

(51) Int. Cl.[7] .............................................. F01B 29/10
(52) U.S. Cl. ........................................... 60/528; 60/527
(58) Field of Search .................... 60/527, 528; 337/140

(56) References Cited

U.S. PATENT DOCUMENTS

| 4,450,686 A | * | 5/1984 | Banks .......................... 60/527 |
| 4,553,393 A | * | 11/1985 | Ruoff ........................ 60/527 X |
| 5,588,295 A | * | 12/1996 | Brotz ........................ 60/527 X |
| 5,619,177 A | * | 4/1997 | Johnson et al. ........... 60/527 X |
| 5,685,149 A | * | 11/1997 | Schneider et al. ......... 60/527 X |

FOREIGN PATENT DOCUMENTS

| BE | 1000335 | 10/1988 |
| DE | 27 23 332 | 11/1978 |
| EP | 0 173 433 | 3/1986 |
| EP | 0 340 364 | 11/1989 |
| EP | 0 508 868 | 10/1992 |
| GB | 2 068 545 | 8/1981 |
| GB | 2 120 788 | 12/1983 |
| JP | 59150983 | 8/1984 |

OTHER PUBLICATIONS

Katsutoshi Kuribayashi, "A New Actuator of a Joint Mechanism Using TiNi Alloy Wire," International Journal of Robotics of Research, 1986, pp. 45–58.

Von Klaus Halter et al., "Formgedachtnislegierungen fur moderne Problemlosungen," Technische Rundschau, May, 1991.

Katsutoshi Kuribayaski, "Improvement of the Response of an SMA Actuator Using a Temperature Sensor," International Journal of Robotics Research, Feb., 1991, pp. 13–20.

* cited by examiner

Primary Examiner—Hoang Nguyen
(74) Attorney, Agent, or Firm—Wells St. John P.S.

(57) ABSTRACT

A positioning device (19) or actuator assembly comprises an actuator (2) constructed from a shape-memory effect (SME) alloy which has a pre-set memorised shape such that, from another shape, the actuator (2) generates a first force when heated above a transition temperature, heat supply means (4, 12) connected to the actuator (2), urging means (24) arranged to exert a second force acting in a direction opposite to the first force, a positionable member (20) moveable between first and second positions under the influence of the first and second forces, and sensing means (53, 54) for detecting the position of the positionable member (20) relative to a reference point. Control means (44) are operably connected with the heat supply means (4, 12) and the sensing means (53, 54) for controlling of the temperature of the actuator (2). Above an elevated temperature above the transition temperature, the positionable member (20) is moved towards its first position against the action of the urging means (24), and below the elevated temperature, the positionable member (20) is moved towards its second position by the urging means (24).

23 Claims, 4 Drawing Sheets

ACTUATOR AND POSITIONING DEVICE

CROSS-REFERENCE TO RELATED APPLICATION

This application claims priority from PCT International Application Number PCT/GB99/02236, which was filed Jul. 12, 1999, and was published in English.

The present invention relates to an actuator and to a positioning device including an actuator.

In certain applications, it is necessary to accurately control the position of one part of a system relative to a second part, either to effect a relative displacement between the parts or to maintain a desired spatial relationship between the parts. For example, the cutting tip of a cutting tool is prone to wear, and requires periodic readjustment. Such readjustment can result in considerable downtime of the tool (in the order of 5%) with a consequent loss of production. Ceramics exhibiting the piezoelectric effect have been used as actuators for accurate positioning purposes, but the range of movement is small (about 5 $\mu$m) and relatively large voltages are required.

An object formed from metal alloys known as shape memory effect (SME) alloys, can be programmed to memorise a particular shape (or shapes) by appropriate heat treatment. When the object (e.g. wire, plate or tube) is cooled below a transition temperature, it can be relatively easily deformed into any desired shape. When the object is heated above that transition temperature, the object forcefully returns to the programmed shape in the absence of an opposing force. This phenomenon arises from a change in state of the SME alloy. The temperature at which this occurs is dependent, inter alia, upon the composition of the alloy used. The force exerted by the object increases above the transition temperature to a maximum potential force at a given elevated temperature.

Such shape memory effect alloys have been used for many purposes, for example, as seals, circuit breakers, surgical stents and clamps. U.S. Pat. No. 4,899,543 discloses the use of a SME alloy-tube as an actuator for a clamp. The tube is located on a spindle between a retaining nut and a first clamping plate. The tube is bolted to the first clamping plate. When cooled, the tube lengthens and presses the first clamping plate against a second clamping plate. On heating, the tube shortens and moves the first clamping plate away from the second clamping plate.

It is an object of the present invention to provide an actuator assembly and positioning device which are capable of producing movement over a relatively large range and which are capable of low voltage operation.

According to a first aspect of the present invention, there is provided a positioning device, said device comprising
  (i) an actuator constructed from a shape-memory effect (SME) alloy, said actuator having a pre-set memorised shape such that, from another shape, the actuator generates a first force when heated above a transition temperature;
  (ii) heat supply means connected to said actuator;
  (iii) urging means arranged to exert a second force acting in a direction opposite to the first force;
  (iv) a positionable member moveable between first and second positions under the influence of said first and second forces;
  (v) sensing means for detecting the position of the positionable member relative to a reference point; and
  (vi) control means operably connected with said heat supply means and said sensing means for controlling the temperature of the actuator;
wherein, above an elevated temperature above the transition temperature, the positionable member is moved towards its first position against the action of the urging means, and wherein, below the elevated temperature, the positionable member is moved towards its second position by the urging means.

Preferably, the control means is arranged in use to cause the temperature of the actuator to be cycled above and below the elevated temperature. (Eg. cycled within a fraction of 1° C. above and below the elevated temperature. It will be understood that this arrangement allows the actuator to be heated above and cooled below the elevated temperature relatively rapidly, thereby enabling a rapid response to whichever of the first and second forces is the greater.

Preferably the actuator is in the form of a plate. More preferably, the actuator has a pre-set memorised relatively planar shape. Most preferably, the actuator is arranged to move from the relatively planar shape to a relatively curved shape under the influence of the second force and from the relatively curved shape to the relatively planar shape under the influence of the first force.

The actuator may have a second pre-set memorised shape, such that, the actuator itself acts as the urging means when cooled below the transition temperature.

Preferably, the positioning device includes clamping means moveable between an open state and a closed state, said clamping means being arranged to clamp the positionable member at a desired position in its closed state, whilst allowing movement of the positionable member in its open state.

Preferably, the clamping means is resiliently biased into the closed state. More preferably, the clamping means includes an actuator constructed from an SME alloy which exerts a force sufficient to open the clamping means when said actuator is heated to an elevated temperature above its transition temperature.

Advantageously, the arrangement is such that the positioning device requires no power when the positionable member is clamped.

Preferably, the sensing means comprises a Hall sensor and a magnet. Conveniently, the magnet is arranged to move in correspondence with the positionable member, and the Hall sensor, located at the reference point, generates an output signal, the strength of which is dependent upon the distance of the magnet from the Hall sensor.

The urging means may conveniently comprise a spring (e.g. torsion, compression or diaphragm spring). A diaphragm spring is preferred.

According to a second aspect of the present invention, there is provided an actuator assembly comprising:
  (i) first and second relatively moveable members;
  (ii) an actuator plate constructed from a shape-memory effect (SME) alloy mounted between and in contact with said first and second members, said actuator plate having a pre-set memorised relatively planar shape, such that, from a relatively curved shape, the actuator plate generates a straightening force and moves towards its relatively planar shape when heated above a transition temperature; and,
  (iii) heat supply means for adjusting the temperature of said actuator plate;
wherein, on raising the temperature of the actuator plate above the transition temperature in the relatively curved shape, the straightening force generated in the actuator plate acts on the first and second members to induce relative movement therebetween.

Preferably, the actuator plate has parallel opposite end surfaces which abut the first and second members respectively. More preferably, said end surfaces have an arcuately curved profile. Most preferably, the arcuately curved end surfaces are located in respective grooves of correspondingly arcuately curved profile provided in facing surfaces of the first and second members respectively. Such an arrangement permits smooth relative movement of the first and second members as the actuator plate moves between its relatively curved and relatively planar shapes.

Preferably, stop means are provided to prevent curvature of the actuator plate beyond a predetermined extent. More preferably no part of the actuator plate is subjected to a strain of more than 4% relative to the pre-set memorised shape.

Preferably, the heat supply means comprises an element (e.g. wire wrapped around the plate or heating element bonded to the surfaces of the plate) which is capable of distributing heat substantially evenly to the actuator plate.

The actuator plate can be constructed from nickel-titanium based alloy ("Nitinol") or copper-zinc-aluminium based alloy. Nickel-titanium alloy is preferred.

Preferably, the elevated temperature for the actuator plate is in the range 55 to 70° C.

According to a third aspect of the present invention, there is provided a machine, a first part of which is to be positioned at a desired location relative to another part, said machine comprising a positioning device in accordance with the first aspect of the present invention and/or an actuator assembly in accordance with the second aspect of the present invention connected with said first part of the machine.

Said machine may be a machine tool.

According to a fourth aspect of the present invention, there is provided a method of positioning a positionable member, said method comprising the steps of:

(i) selecting a desired position for the positionable member between first and second positions;

(ii) causing a force to be applied to the positionable member when the positionable member is between the desired position and the second position as determined by step (iii), so as to urge the positionable member towards the first position;

(iii) sensing the position of the positionable member;

(iv) causing a force to be applied to the positionable member when the positionable member is between the first position and the desired position as determined by step (iii), so as to urge the positionable member towards the second position; and (v) preventing movement of the positionable member when it has reached the desired position;

wherein, step (ii) is effected by heating an actuator constructed from a shape memory effect alloy above its transition temperature.

Step (v) may be effected by clamping the positionable member in the desired position.

An embodiment of the present invention will now be described by way of example, with reference to the accompanying drawings in which:

FIG. 6 is a schematic diagram of a tool and hand held controller, and

Figure 1:
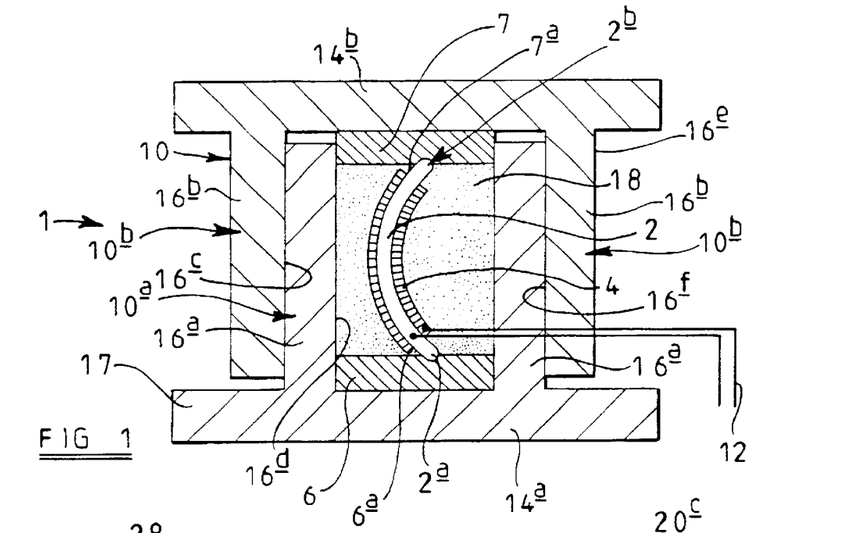
FIG. 1 is a cross section of an actuator assembly in accordance with the second aspect of the present invention.

Referring to FIG. 1, an actuator assembly 1 comprises a relatively planar actuator plate 2, a heating element 4, first and second load-bearing end caps 6,7 (made from a polymer sold under the trademark "Tufnol") and a housing 10. The actuator plate 2 is formed from a sheet of nickel-titanium material cut into a rectangular shape with opposite parallel edges 2a,2b of arcuately curved profile. The actuator plate 2 is heated above its transition temperature of 55° C. and cooled whilst being held in a relatively planar but slightly curved shape, so as to provide the actuator plate 2 with a pre-set memorised shape (as shown in FIG. 1). The heating element 4 is a wire which is wound in a regular pattern around the actuator plate 2 between its end surfaces 2a,2b and which is bonded to the plate 2. A pair of insulated wires 12 are connected to the heating element 4 and to an electrical supply (not shown). Each of the rigid end caps 6,7 is provided with a groove 6a,7a of arcuate profile which serves to locate respective end surfaces 2a,2b.

The housing 10 consists of first and second housing parts 10a, 10b each having a base 14a,14b with a pair of spaced arms 16a, 16b extending perpendicularly therefrom. Each of the arms 16a has a part-cylindrical outer surface 16c and a planar inner surface 16d. Each of the arms 16b has a part-cylindrical outer surface 16e and a part-cylindrical inner surface 16f, the latter adapted to be a sliding fit with the outer surface 16c of the respective arm 16a. The shape and spacing of the arms 16a,16b are such that the arms 16a are telescopically received in the arms 16b. The end caps 6,7 are a sliding fit within the arms 16a. The end cap 6 abuts the base 14a of the first part 10a and the end cap 7 abuts the base 14b of the part 10b. Space between the actuator plate 2 and the arms 16a is filled with a flexible heat-insulating material 18 made from a silicon elastomer. The extent to which the actuator plate 2 can be flexed is limited by abutment of the free ends of the arms 16a with the base 14b of the second part 10b and abutment of the free ends of the arms 16b with a rim 17 of the base 14a of the first 10a. To ensure an acceptable working life for the actuator plate 2 no part of the plate 2 is subjected to a strain of greater than 4% (relative to the memorised shape) when flexed.

In use, a small external force to either base 14a,14b of the parts 10a,10b causes the parts 10a,10b to telescope, thereby pushing the end caps 6,7 towards each other with flexure of the actuator plate 2 to a relatively curved shape. However, on supplying a voltage to the heating element 4, the actuator plate 2 is substantially uniformly heated to above its transition temperature causing the actuator plate 2 to regain its relatively planar memorised shape by pushing against the end caps 6,7 which move apart with a force greater than that which was required to deform it. It will be noted that the curvature of the plate 2 is more pronounced towards the centre of the plate 2 when flexed, thereby effecting a greater movement of its ends 2a, 2b than at the centre when the plate 2 straightens. The arcuately profiled end surfaces 2a,2b and corresponding grooves 6a,7a in the end caps 6,7 permit smooth movement of the end caps 6,7 and abutting parts 10a,10b. On cooling below the transition temperature, the actuator plate 2 can once more be easily flexed by the small external force. The actuator plate 2 is given a slightly curved memorised shape so that the transition between the memorised and relatively curved shapes is reliable. A planar actuator plate might kink or otherwise curve unevenly. By heating the actuator plate 2 substantially uniformly over its entire surface, undue stress at any given point on the actuator plate 2 is avoided, thereby enabling the heating/cooling cycle to be repeated many times without breakage of the actuator plate 2.

Figure 2:
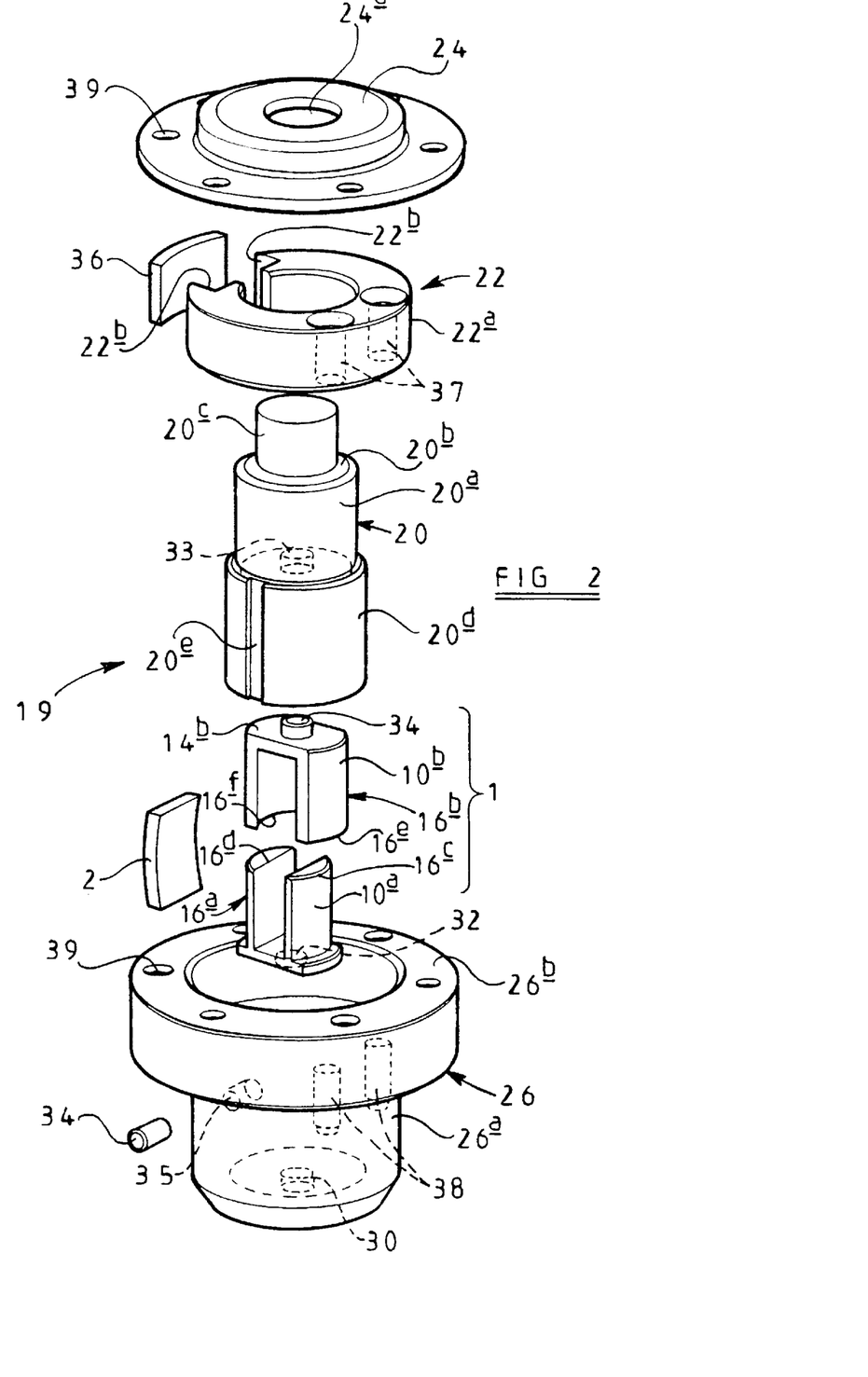
FIG. 2 is an exploded view of part of a positioning device in accordance with the first aspect of the present invention.
Figure 3:
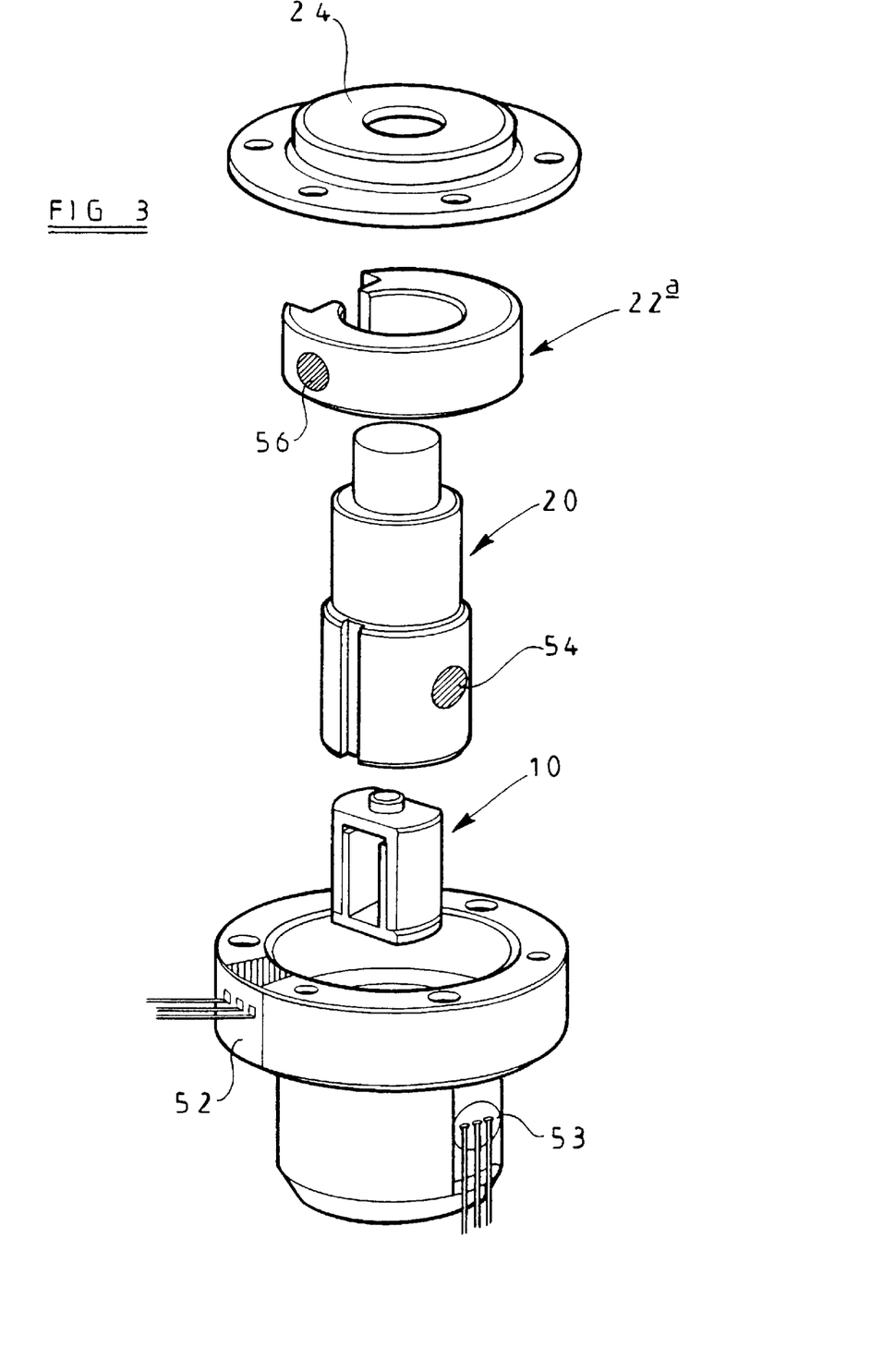
FIG. 3 shows the position of the sensors and magnets of the positioning device shown in FIG. 2, FIGS. 4 and 5 are cross-sections of components of the device shown in FIG. 2

Referring to FIGS. 2 to 5, a positioning device 19 for a work tool comprises an actuator assembly 1 similar to that described with reference to FIG. 1 (only actuator plate 2 and housing parts 10a, 10b are shown in FIG. 2), a positionable member in the form of a tool support 20, a clamp 22, a return spring 24 and a housing body 26.

The housing body 26 has an annular seating surface 28 (FIG. 4) defined between a cup-shaped portion 26a and a collar 26b. A locating recess 30 is provided centrally in the base of the cup-shaped portion 26a. The first housing part 10a has a locating stud 32 centrally disposed on its base 14a, which stud 32 serves to locate the actuator assembly 1 within the cup-shaped portion 26a of the housing body 26. A first Hall sensor 52 (FIG. 3) is disposed in a slot provided in the collar 26b and a second Hall sensor 53 is disposed in a hole provided in a wall of the cup-shaped portion 26a.

The tool support 20 (FIG. 5) has a cylindrical main portion 20a with an inward step 20b to an integrally formed cylindrical cap 20c. At an end remote from the cap 20c, a part-annular skirt 20d depends from the main portion 20a and defines the edges of a longitudinal slot 20e. The skirt 20d receives the actuator assembly 1 and sits in the cup-shaped portion 26a of the housing body 26. A first samarium-cobalt magnet 54 (FIG. 3) is provided in a recess in a peripheral outer surface of the skirt 20d, said magnet 54 being disposed adjacent the second Hall sensor 53 in the assembled device. A recess 33 in the main portion 20a of the tool support 20 receives a locating stud 34 projecting from the second housing part 10b. Rotation of the assembly 1 and tool support 20 within the housing body 26 is prevented by a guide pin 34 which passes through a hole 35 in a side of the cup-shaped portion 26a of the housing body 26 and into the slot 20e. Thus, only linear movement of the tool support 20 in an axial direction is possible.

The clamp 22 comprises a part annular clamping collar 22a with an actuator assembly as described with reference to FIG. 1 (only actuator plate 36 shown in FIG. 2) held between load-bearing surfaces 22b of the clamping collar 22a. The clamping collar 22a encircles the main portion 20a of the tool support 20, and when the device is assembled, rests on the seating surface 28 of the housing body 26. A second samarium-cobalt magnet 56 (FIG. 3) is provided in a peripheral outer surface of the clamping collar 22a, and is disposed adjacent the first Hall sensor 52 in the assembled device. The clamping collar 22a is secured to the housing body 26 by bolts (not shown) which pass through holes 37 provided in the clamping collar 22a and into aligned blind bores 38 in the cup-shaped portion 26a of the housing body 26. The return spring 24 is a metal plate with a centrally disposed hole 24a therethrough. The hole 24a receives the cap 20c of the tool support 20. The return spring 24 presses against the step 20b in the tool support 20. The return spring 24 also acts as a lid for the assembly and maintains all the components in the housing body 26. Aligned holes 39 are provided in the return spring 24 and collar 26b of the housing body 26 for retaining bolts (not shown).

Figures 4, 5, 6:
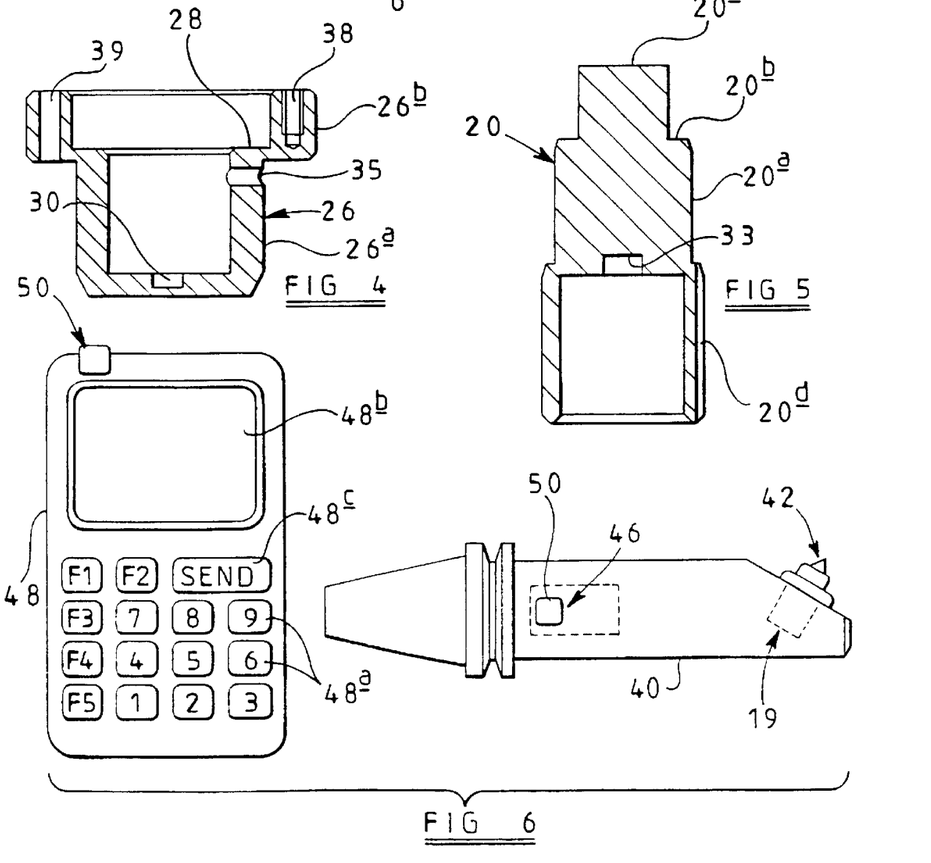

Referring to FIG. 6, the positioning device partly shown in FIG. 2 is housed at the end of a boring bar 40 of a cutting tool. A cutting tip 42 is firmly secured to the tool support 20. In this embodiment, the positioning device 19 is designed such that the range of movement of the tool support 20 (and hence cutting tip 42) is 250 $\mu$m. Power for the heating element 4, the Hall sensors 52, 53 and heating element (not shown) for the clamp actuator 36 is supplied by a battery (not shown) located within the boring bar 40. Opening and closing of the clamp 22 and movement of the cutting tip 42 is regulated by control electronics 44 (see FIG. 7), which in this embodiment are housed in the boring bar 40. The control electronics 44 are arranged to transmit data to and receive data from a hand held controller 48 via an ultrasound transmitter/receiver 50. The hand-held controller 48 has buttons 48a for inputting data and an LCD screen 48b for displaying information.

The positioning device 19 is pre-calibrated. This is necessary because of non-linearity of the Hall sensor 53 over the 250 $\mu$m range. Such calibration can be achieved by, for example, setting the output voltage of the sensor 53 to 0V at the maximum 250 $\mu$m distance, followed by incrementing the cutting tip 42 in 1 $\mu$m steps to a zero position using an external calibrated probe (not shown). These values can then be stored in a look-up table.

In use, when a re-adjustment of the cutting tip is required, machining is stopped, and an operator inputs the desired position for the cutting tip 42 into the hand held controller 48. Pressing of a SEND button 48c transmits a digital signal to the control electronics 44 in the boring bar 40. The transmitted signal is sampled several times to detect any possible data corruption, and a prompt to re-enter the desired position or a confirmation message is displayed on the LCD screen 48b. The desired position and current position of the tool support 20 are compared and a control signal is generated. A predetermined voltage is fed to the heating element of the clamp actuator 36, thereby causing the clamp 22 to open. The first Hall sensor 52 and second magnet 56 allow the position of the clamp 22 to be detected by the control electronics 44. In this embodiment, the return spring 24 resets the tool support 20 to a zero position (i.e. the arms 16b of the second actuator housing part 10b in abutment with the rim 17 of the first actuator housing part) each time the clamp 22 is released. Once the control electronics 44 detect that the clamp 22 is opening, a current is passed through the heating element 4 of the actuator assembly 1. In the absence of an opposing force, the plate 2 would return to its memorised shape at 55° C. However, the force exerted by the plate increases as the temperature rises, to a maximum potential force at approximately 70° C. Thus, in the present embodiment, the temperature is raised to an elevated temperature at which the plate 2 starts to move. The temperature continues to rise (overcoming progressively greater resistance) until the desired position is reached. This position is held by moderating the temperature and hence the force exerted by the plate 2. The temperature moderation required may be as little as a fraction of 1° C. Once the desired position has been reached, the clamp 22 closes to fix the tool support 20 in the desired position. When clamped, power to the clamp actuator 36 is removed. The control electronics 44 transmit a status signal to the hand-held controller 48 and a suitable confirmation message is displayed on the LCD screen 48b. Machining can then recommence.

In another embodiment (not shown), the whole process, including position selection is computer controlled, thereby obviating the need for a hand held controller.

Figure 7:
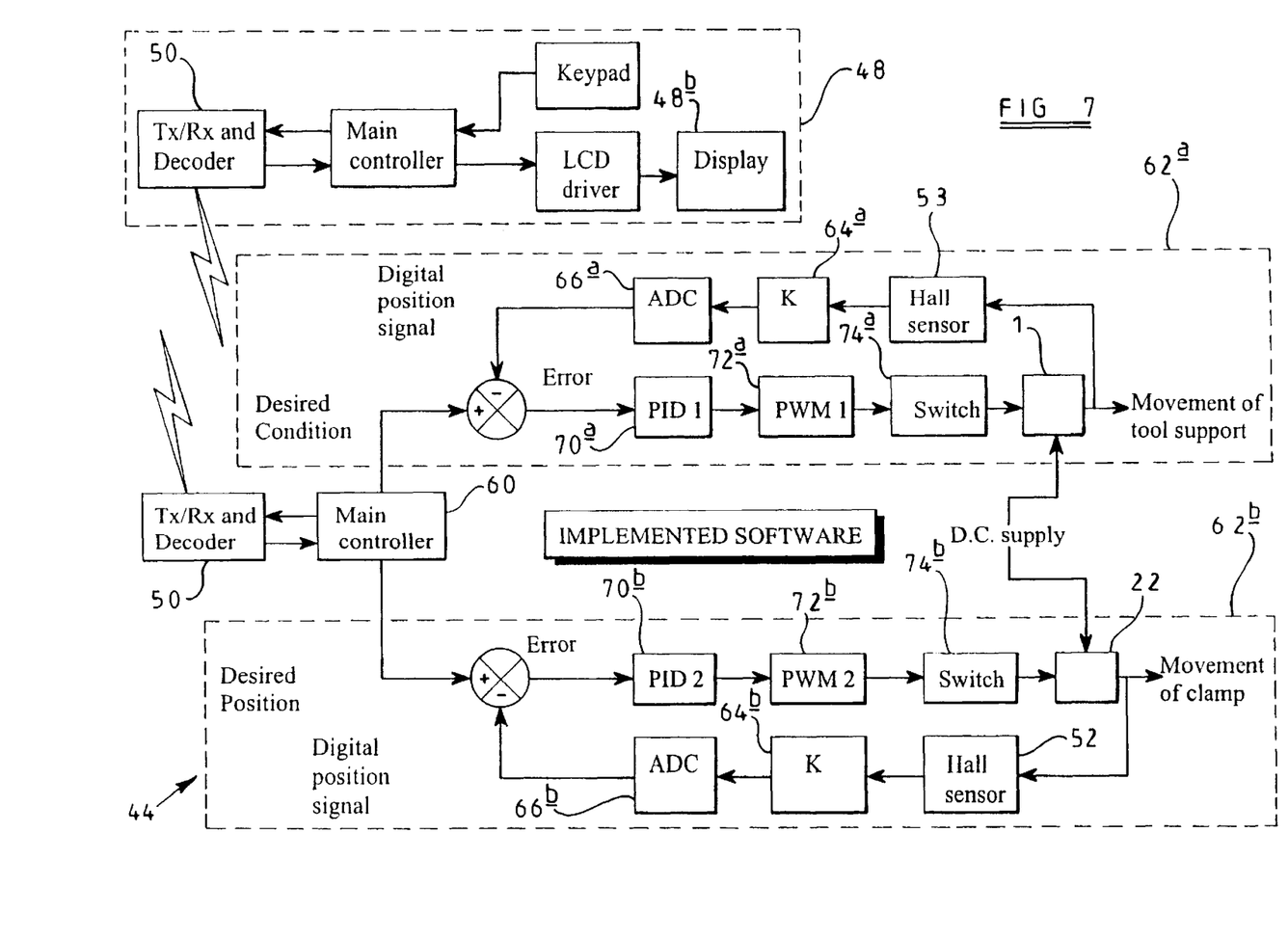
FIG. 7 is a system block diagram showing the control electronics for the tool of FIG. 6.

Referring to FIG. 7, the control electronics 44 are shown in more detail. A microcontroller 60 co-ordinates first and second closed-loops 62a, 62b for the positioning of the tool support 20 and operation of the clamp 22 respectively.

The Hall sensor 52 associated with the clamp 22 generates a signal which passes through an amplifier 64b and is output into an analogue-digital converter (ADC) channel 66b. If the status of the clamp 22 is to be changed, a signal is output from a PID (proportional integral derivative) controller 70b to a pulse width modulator (PWM) 72b thereby causing a switch 74b controlling the heating element of the clamp actuator 36 to be activated. The output from the Hall sensor 52 is continually monitored and the heating element is cycled on and off to maintain the clamp 22 in a desired open position.

Similarly, for the positioning loop 62a, an output from the Hall sensor 53 passes through an amplifier 64a and an ADC 66a. The signal is compared with the value stored in the look-up table for the desired position of the tool support 20 by the microcontroller 60. If there is a difference, the heating element 4 is switched on or off by a PWM signal generated by a PID controller 72a through a switch 74a. The tool support 20 moves, the output from the Hall sensor 53 changes and the cycle repeats. When the tool support 20 has reached the desired position, a signal is sent to the clamp loop 62b to close the clamp 22. When the clamp 22 has reached its closed position, the positioning loop 62a is deactivated.

Using the above circuitry, it is possible to rapidly cycle the actuator plate 2 above and below the elevated temperature. In this way, the position of the cutting tip 42 can be accurately controlled to within $\pm 0.51$ $\mu$m.

In another embodiment (not shown), the first Hall sensor 52 is omitted and the clamp status is monitored using a proximity switch which could be set to detect two positions only (open or closed). Alternatively, a resistive thermal device (RTD) sensor could be attached to the heating element of the clamp actuator.

As a further alternative, the clamp status is not monitored. The clamp is fed a pre-determined voltage sufficient to open the clamp and is powered down when the desired position for the cutting tip has been reached.

What is claimed is:

1. A positioning device comprising:
   (i) an actuator constructed from a shape-memory effect alloy, said actuator having a pre-set memorised shape such that, from another shape, the actuator generates a first force when heated above a transition temperature;
   (ii) heat supply means connected to said actuator;
   (iii) urging means arranged to exert a second force acting a direction opposite to the first force;
   (iv) a positionable member moveable between first and second positions under the influence of said first and second forces;
   (v) sensing means comprising a Hall sensor and a magnet for detecting the position of the positionable member relative to a reference point; and
   (vi) control means operably connected with said heat supply means and said sensing means for controlling the temperature of the actuator;
   wherein, above an elevated temperature above the transition temperature, the positionable member is moved towards its first position against the action of the urging means, and wherein, below the elevated temperature, the positionable member is moved towards its second position by the urging means.

2. A device as claimed in claim 1, wherein the control means is arranged in use to cause the temperature of the actuator to be cycled above and below the elevated temperature.

3. A device as claimed in claim 1, wherein the actuator is in the form of a plate and has a pre-set memorised relatively planar shape.

4. A device as claimed in claim 3, wherein the actuator is arranged to move from the relatively planar shape to a relatively curved shape under the influence of the second force and from the relatively curved shape to the relatively planar shape under the influence of the first force.

5. A device as claimed in claim 1, wherein clamping means moveable between an open state and a closed state are included, said clamping means being arranged to clamp the positionable member at a desired position in its closed state, whilst allowing movement of the positionable member in its open state.

6. A device as claimed in claim 5, wherein the clamping means is resiliently biased into the closed state.

7. A device as claimed in claim 6, wherein the clamping means includes an actuator constructed from an SME alloy which exerts a force sufficient to open the clamping means when said actuator is heated to an elevated temperature above its transition temperature.

8. A device as claimed in claim 1, wherein the magnet is arranged to move in correspondence with the positionable member, and the Hall sensor, located at the reference point, generates an output signal, the strength of which is dependent upon the distance of the magnet from the Hall sensor.

9. An actuator assembly comprising:
   (i) first and second relatively moveable members;
   (ii) an actuator plate having parallel opposite end surfaces which have an arcuately curved profile and which abut the first and second members respectively, the actuator plate being constructed from a shape-memory effect alloy and mounted between and in contact with said first and second members, said actuator plate having a pre-set memorised relatively planar shape, such that, from a relatively curved shape, the actuator plate generates a straightening force and moves towards its relatively planar shape when heated above a transition temperature; and
   (iii) heat supply means for adjusting the temperature of said actuator plate;
   wherein, on raising the temperature of the actuator plate above the transition, temperature in the relatively curved shape, the straightening force generated in the actuator plate acts on the first and second members to induce relative movement therebetween.

10. An assembly as claimed in claim 9, wherein the arcuately curved end surfaces are located in respective grooves of correspondingly arcuately curved profile provided in facing surfaces of the first and second members respectively.

11. An assembly as claimed in claim 9, wherein stop means are provided to prevent curvature of the actuator plate beyond a predetermined extent.

12. An assembly as claimed in claim 11, wherein the stop means are arranged so that no part of the actuator plate is subjected to a strain of more than 4% relative to the pre-set memorised shape.

13. An assembly as claimed in claim 9, wherein the heat supply means comprises an element which is capable of distributing heat substantially evenly to the actuator plate.

14. An assembly as claimed in claim 9, wherein the actuator plate is constructed from nickel-titanium based alloy or copper-zinc-aluminium based alloy.

15. An assembly as claimed in claim 9, wherein the elevated temperature for the actuator plate is in the range 55 to 70° C.

16. A machine having a first part which is to be positioned at a desired location relative to another part, said machine having a positioning device comprising:
   an actuator constructed from a shape-memory effect alloy, said actuator having a pre-set memorised shape such that, from another shape, the actuator generates a first force when heated above a transition temperature, and wherein the actuator further comprises:
  (i) first and second relatively moveable members;
wherein, above an elevated temperature above the transition temperature, the positionable member is moved towards its first position against the action of the urging means, and wherein, below the elevated temperature, the positionable member is moved towards its second position by the urging means, and wherein the actuator assembly is connected with the first part of the machine.

17. A machine as claimed in claim 16 which is a machine tool.

18. A method of positioning a positionable member, said method comprising the steps of:
  (i) selecting a desired position for the positionable member between first and second positions;
  (ii) causing a force to be applied to the positionable member when the positionable member is between the desired position and the second position as determined by step (iii), so as to urge the positionable member towards the first position;
  (iii) sensing the position of the positionable member;
  (iv) causing a force to be applied to the positionable member when the positionable member is between the first position and the desired position as determined by step (iii), so as to urge the positionable member towards the second position; and
  (v) preventing movement of the positionable member by clamping when it has reached the desired position;
wherein, step (ii) is effected by heating an actuator constructed from a shape memory effect alloy above its transition temperature and wherein the positionable member can be clamped at the first position, the second position and all positions therebetween.

19. A positioning device comprising:
  (i) an actuator constructed from a shape-memory effect alloy, said actuator having a pre-set memorised shape such that, from another shape, the actuator generates a first force when heated above a transition temperature;
  (ii) heat supply means connected to said actuator;
  (iii) urging means arranged to exert a second force acting in a direction opposite to the first force;
  (iv) a positionable member moveable between first and second positions under the influence of said first and second forces;
  (v) sensing means for detecting the position of the positionable member relative to a reference point; and
  (vi) control means operably connected with said heat supply means and said sensing means for controlling the temperature of the actuator;
wherein, above an elevated temperature above the transition temperature, the positionable member is moved towards its first position against the action of the urging means, and wherein, below the elevated temperature, the positionable member is moved towards its second position by the urging means and wherein the positional member can be maintained at any desired position between said first and second positions by cycling the temperature of the actuator above and below the elevated temperature in a temperature range of no more than 1° C.

20. A device as claimed in claim 19, wherein clamping means are provided, said clamping means being arranged to clamp the positional member at any desired position between said first and second positions.

21. A positioning device comprising:
  (i) an actuator constructed from a shape-memory effect alloy, said actuator having a pre-set memorised shape such that, from another shape, the actuator generates a first force when heated above a transition temperature;
  (ii) heat supply means connected to said actuator, said heat supply means comprising an element which is arranged to distribute heat substantially evenly to the actuator plate;
  (iii) urging means arranged to exert a second force acting in a direction opposite to the first force;
  (iv) a positionable member moveable between first and second positions under the influence of said first and second forces;
  (v) sensing means for detecting the position of the positionable member relative to a reference point; and
  (vi) control means operably connected with said heat supply means and said sensing means for controlling the temperature of the actuator;
wherein, above an elevated temperature above the transition temperature, the positionable member is moved towards its first position against the action of the urging means, and wherein, below the elevated temperature, the positionable member is moved towards its second position by the urging means.

22. A actuator assembly comprising:
  (i) first and second relatively movable members;
  (ii) an actuator plate constructed from a shape-memory effect alloy mounted between and in contact with said first and second members, said actuator plate having a pre-set memorised relatively planar shape, such that, from a relatively curved shape, the actuator plate generates a straightening force and moves towards its relatively planar shape when heated above a transition temperature; and,
  (iii) heat supplying means for adjusting the temperature of said actuator plate, said heat supply means comprising an element which is arranged to distribute heat substantially evenly to the actuator plate;
wherein, on raising the temperature of the actuator plate above the transition temperature in the relatively curved shape, the straightening force generated in the actuator plate acts on the first and second members to induce relative movement therebetween.

23. A machine having a first part which is to be positioned at a desired location relative to another part, said machine having a positioning device comprising:
  an actuator constructed from shape-memory effect alloy, said actuator having a pre-set memorised shape such that, from another shape, the actuator generates a first force when heated above a transition temperature, and wherein the actuator further comprises
  (i) first and second relatively moveable members;
  (ii) an actuator plate having parallel opposite end surfaces which have an arcuately curved profile and which abut the first and second ends respectively, the actuator plate being constructed from a shape-memory effect alloy and mounted between and in contact with said first and second member, said actuator plate having a pre-set memorised relatively planar shape, such that, form a relatively curved shape, the actuator plate generates a straightening force and moves towards its relatively planar shape when heated above a transition temperature; and
  (iii) heat supply means for adjusting the temperature of said actuator plate;

wherein, on raising the temperature of the actuator plate above the transition temperature in the relatively curved shape, the straightening force generated in the actuator plate acts on the first and second members to induce relative movement therebetween;

urging means arranged to exert a second force acting in a direction opposite to the first force;

a positionable member moveable between first and second positions under the influence of said first and second forces;

sensing means for detecting the position of the positionable member relative to a reference point; and control means operably connected with said heat supply means and said sensing means for controlling the temperature of the actuator;

wherein, above an elevated temperature above the transition temperature, the positionable member is moved towards its first position against the action of the urging means, and wherein, below the elevated temperature, the positionable member is moved towards its second position by the urging means, and wherein the actuator assembly is connected with the first part of the machine.

* * * * *